United States Patent

Gaasvik et al.

[11] Patent Number: 5,898,923
[45] Date of Patent: Apr. 27, 1999

[54] REGISTRATION METHOD IN A CELLULAR MOBILE RADIO SYSTEM

[75] Inventors: Per-Ola Gaasvik, Jarfalla; Georg William Robin Chambert, Uppsala; Stig Roland Bodin, Spanga, all of Sweden

[73] Assignee: Telefonaktiebolaget LM Ericsson, Stockholm, Sweden

[21] Appl. No.: 08/763,353

[22] Filed: Dec. 11, 1996

Related U.S. Application Data

[63] Continuation of application No. 08/571,280, Dec. 12, 1995, abandoned, which is a continuation of application No. 08/149,799, Nov. 10, 1993, abandoned.

[30] Foreign Application Priority Data

Sep. 23, 1993 [SE] Sweden .................................. 9303110

[51] Int. Cl.$^6$ ..................................................... H04Q 7/00
[52] U.S. Cl. .......................... 455/434; 455/435; 455/458
[58] Field of Search .................................. 455/432, 422, 455/434, 435, 436, 450, 452, 455, 458

[56] References Cited

U.S. PATENT DOCUMENTS

| | | | |
|---|---|---|---|
| 5,081,679 | 1/1992 | Dent ........................................ | 455/33.1 |
| 5,101,500 | 3/1992 | Marui ..................................... | 455/33.1 |
| 5,212,822 | 5/1993 | Fukumine et al. ..................... | 455/33.1 |
| 5,289,527 | 2/1994 | Tiedemann, Jr. . | |

FOREIGN PATENT DOCUMENTS

| | | |
|---|---|---|
| 0260763 A2 | 3/1988 | European Pat. Off. . |
| 0 344 989 | 12/1989 | European Pat. Off. . |
| 04396228A1 | 8/1991 | European Pat. Off. . |
| 0439628 A1 | 8/1991 | European Pat. Off. . |
| 0475865 A2 | 3/1992 | European Pat. Off. . |
| 0541026 A2 | 5/1993 | European Pat. Off. . |
| 0617566 A1 | 9/1994 | European Pat. Off. . |
| 221009 | 3/1990 | New Zealand . |
| 2172775 | 9/1986 | United Kingdom . |
| 2243976 | 11/1991 | United Kingdom . |

OTHER PUBLICATIONS

S. Okasaka et al., "A New Location Updating Method for Digital Cellular Systems," Proceedings of the 41st IEEE Vehicular Technology Conference, St. Louis, Mo., pp. 345–350 (May 19–22,(1991).

*Primary Examiner*—Thanh Cong Le
*Attorney, Agent, or Firm*—Burns, Doane, Swecker & Mathis, L.L.P.

[57] ABSTRACT

The present invention relates to a method of registering a mobile station in a cellular mobile radio system in which areas, each including a plurality of cells, form registration areas. Each registration area (RA1, RA2, RA3, . . . ) has its own identity (X). According to the proposed method, individual location areas are defined whenever registering a given mobile station with the intention of avoiding an unnecessarily high number of registrations in border areas of the different registration areas. A location area may have the form of a list of registration areas (X1, X2, X3, . . . ), which is stored in a mobile station (MS), or may be stored in the system (HLR, MSC) and transmitted to the mobile station (MS) via a base station (BS) in a given registration area, in conjunction with registration of the mobile station in this area. A new registration is made only if the mobile station enters a service area that belongs to a registration area whose identity (X) is not found on the stored list of registration areas (X1, X2, X3, . . . ).

10 Claims, 4 Drawing Sheets

REGISTRATION METHOD IN A CELLULAR MOBILE RADIO SYSTEM

This application is a continuation of application Ser. No. 08/571,280, filed Dec. 12, 1995, abandoned, which application is a File Wrapper Continuation Application of U.S. Ser. No. 08/149,799 filed Nov. 10, 1993, abandoned.

TECHNICAL FIELD

The present invention relates to a method of registration in a cellular mobile radio system which includes a plurality of registration areas, each being divided into service areas or cells and all of said registration areas covering all service areas, and in which each service area is served by a base station for those mobile stations that are located in the associated service area. The inventive method can be applied, for instance, to a mobile telephone system of the kind in which the registration areas do not overlap one another and has for each such area a defined identity which clearly discloses the registration area.

BACKGROUND ART

In a cellular mobile telephone system, the various cells of the system are often collected in so-called registration areas. A mobile station is registered initially in a certain area, the home area, and a calling subscriber, possibly from another registration area, is able to reach the mobile station as a result of the base station (BS) and the associated mobile telephone switching centre (MSC:n) having recorded in its home location register (HLR) the registration area in which the called subscriber (the mobile station) is located.

If the mobile station moves to another registration area (so-called roaming), it is important that the mobile station registers itself in the new area and that this new registration is recorded in the home location register of the mobile station. If the mobile station fails to register its new area, it will be extremely difficult for the land system (mobile telephone exchange and home location register) to page the mobile station when this station is called by a calling subscriber. On the other hand, when the new registration identity is recorded in the home location register, the land system is able to establish the registration area in which the subscriber is located, thereby enabling to page the subscriber and set-up a call connection.

It is thus of great importance that each mobile station within the system registers itself as soon as it crosses the border between two registration areas.

The registration areas must not be made too large, because of the balance that needs to be maintained between paging traffic on the one hand (i.e. the traffic created when the mobile subscribers are paged from the land system) and the number of registrations within the area on the other. Small registration areas will preferably be chosen, when the number of registrations is permitted to be high while paging traffic shall be kept low. Larger registration areas can be permitted when the opposite case applies, i.e. when paging traffic can be permitted to be high and the number of registrations shall be kept low. A balance between these two mutually conflicting requirements is made in the majority of cases in a mobile radio system.

As is known, registration is effected by a base station within the service area in which the mobile station is located transmits a global message which contains the registration identity of its own registration area. In the case of the U.S. digital system according to standard "IS-54B" for instance, this message is transmitted over the FOCC-channel (forward analog control channel) and periodically to all mobile stations within the service area. A mobile station reports that it is new in the area and thus that registration is desired, see FIG. 1. This request is normally transmitted over the RECC-channel (reverse analog control channel). Thus, if a mobile station has not stored the transmitted registration identity, it asks to be registered.

Registration creates a particular problem when a mobile station moves in the vicinity of and across the borders of one or more registration areas. A large number of registrations may be entailed by a mobile station crossing several such borders. It will be understood from the aforegoing that a given control channel capacity is used in a registration. It would be desirable to reduce the extent to which the channels of the system are used as much as possible. As before mentioned, the identification message is transmitted from a base station over the control channel FOCC periodically and cannot therefore be altered. However, the number of accesses requesting registration of mobiles over RECC and responsive acknowledgements over FOCC can be influenced when registrations, and therewith the number of subsequent updates "registration update" from the base station, are only required and effected on seldom occassions. This would result in a reduction in the control channel capacity used.

EP-A1-0,439,628, for instance, teaches an improved registration method for reducing and distributing the number of registrations to a given extent. This method is applied in systems in which a base station belongs to several location areas (=registration areas), i.e. several mutually overlapping location areas. According to this method, a list of those identities of the registration areas in the location area to which the base station belongs is transmitted periodically from the base station. These identities are compared with the identity which is stored at that time in a listening mobile station. If none of the identities received and read by the mobile coincide with the identity that is stored in the mobile station the mobile station registers in the registration area, the identity of which is first read from the transmitted list. this procedure reduces the number of registrations, since the mobile station is located in the centre of the new location area instead of at its outer border when making any new registration, i.e. a space hysteresis is generated which avoids oscillating registration.

SUMMARY OF THE INVENTION

Although the aforesaid method taught by EP-A1-0,439,628 will reduce the number of registrations and afford a given degree of flexibility as the mobile stations move, this flexibility is restricted to the global location areas that have been determined by the land system.

An object of the present invention is to reduce still further the number of registrations in a cellular mobile radio system containing registration areas in relation to prior art techniques.

Another object of the present invention is to provide a method for application in a cellular mobile radio system which includes registration areas which will enable the registration method to be better adapted to an individual mobile station when the mobile station moves between the different registration areas and, at the same time, a smaller number of registrations in relation to prior art techniques.

A further object of the present invention is to provide a method for storing area-identities in a mobile station in the process of registration, so that the mobile station need not register itself in the earlier known manner when moving across a given number of registration areas in a given, predetermined manner.

In accordance with the proposed method, a so-called location area is defined as being an area which includes parts of two or more registration areas (or whole such registration areas) and a given mobile station is allocated a particular location area that is a function of both the mobile station and the registration occasion. The location area for a given mobile station is defined conveniently as a list of registration identities which is transmitted to the mobile station in conjunction with registration.

The inventive method is characterized by the method features set forth in claims 1–6.

An inventive mobile station is characterized by the features set forth in claims 7–8.

BRIEF DESCRIPTION OF THE DRAWINGS

The invention will now be described in more detail with reference to the accompanying drawings, in which.

BEST MODES OF CARRYING OUT THE INVENTION

Figure 1:
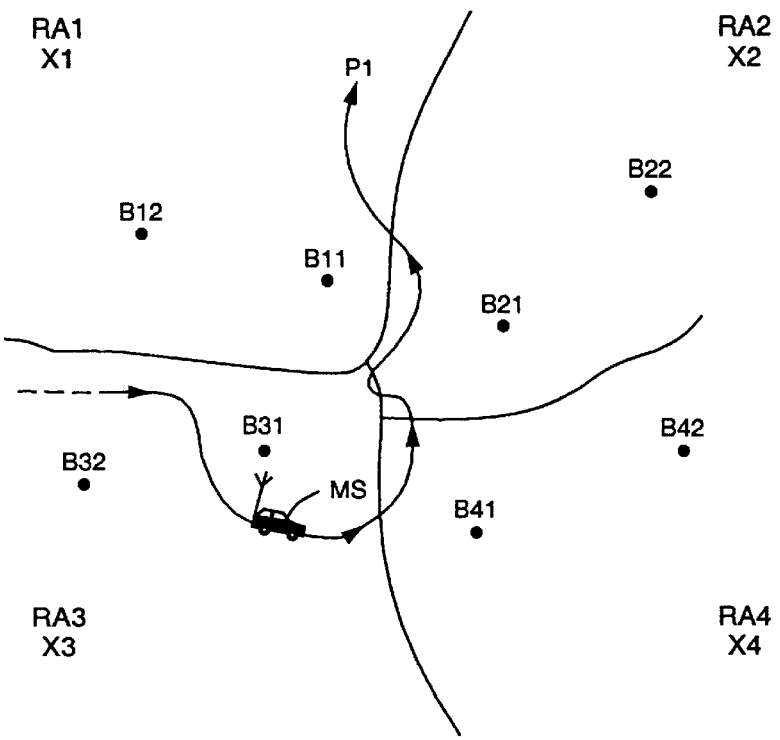
FIG. 1 is a diagram which illustrates parts of four registration areas of a cellular mobile radio system according to known techniques.

FIG. 1 is a simplified diagram which illustrates part of four registration areas RA1, RA2, RA3 and RA4 of a cellular mobile radio system of a known kind, for instance from U.S. Pat. No. 5,081,679 which is incorporated herein by reference. Each of the registration areas RA1–RA4 includes a number of cells or service areas, and each service area is served by a base station.

The registration area RA1 includes the two illustrated base stations B11 and B12, each of which serves a respective service area S11 and S12.

The registration area RA2 includes the two illustrated base stations B21 and B22, each of which serves a respective service area S21 and S22.

The registration area RA3 includes the two illustrated base stations B31 and B32, each of which serves a respective service area S31 and S32.

The registration area RA4 includes the two illustrated base stations B41 and B42, each of which serves a respective service area S41 and S42.

A given registration area has a given identity X which is unique to said area and which is used in the registration of those mobile stations that enter this area. In the FIG. 1 example, it is assumed that X=X1 for the registration area RA1
X=X2 for the registration area RA2
X=X3 for the registration area RA3
X=X4 for the registration area RA4

Thus, by "registration area" is meant an area within a cellular mobile radio system which has one and the same registration identity X for the registration of the various mobile stations. Thus, the base stations B31 and B32 send the identity X=X3 to a mobile station MS which enters the registration area RA3 or is already located in said area, so as to update registration when the mobile station is not registered but requests to be so.

Figure 2A:
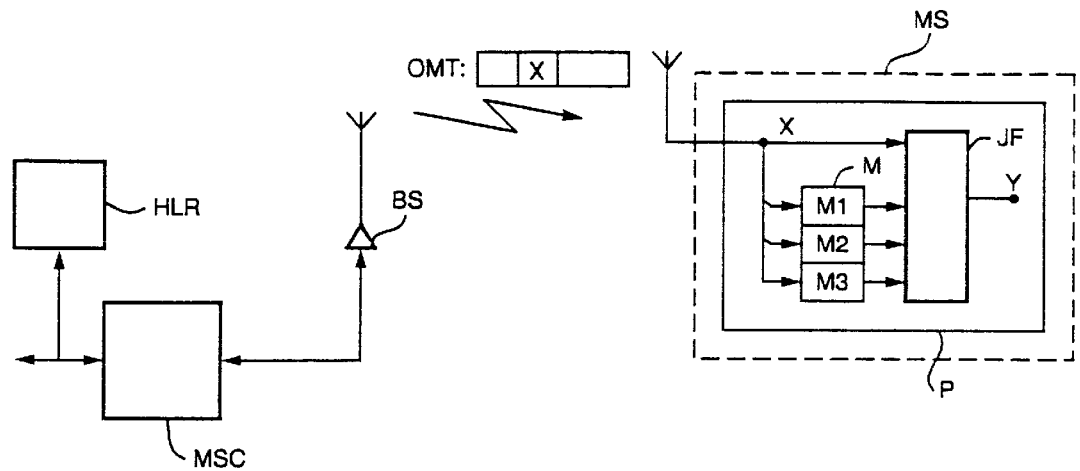
FIGS. 2a–2c are block diagrams which illustrate a radio connection between a mobile station and a base station at different points in time when carrying out the inventive method.
Figure 2B:
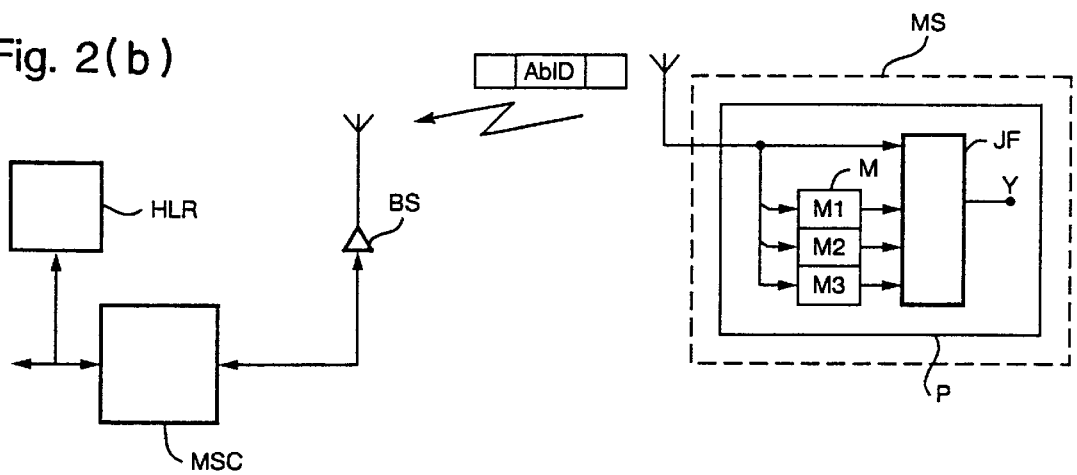

It is assumed that the mobile station MS has entered the area RA3 and has been registered in this area as a result of the base station B32 having received the subscriber identity of the mobile station MS in a known manner and having informed the mobile telephone switching centre of the land system of this identity, the switching centre storing this identity in the home location register (see FIG. 2b). The mobile station MS is therewith allocated the registration identity X=X3 and stores and retains this identity for as long as it remains in the area RA3. The mobile station MS is assumed to move towards the border between the registration areas RA3 and RA4 and enter the area RA4. It is necessary for the mobile to register itself in this area, since the base station B41 transmits the aforesaid global message (via FOCC) with its registration area identity. If the mobile station MS has not stored this identity, it asks for a registration update in accordance with the aforegoing.

It is assumed that the mobile station continues along a path indicated by the arrows in FIG. 1 and is therefore necessitated to make several registration updates in the same manner as that carried out in area RA4, i.e. continues to update its registration in area RA2 when passing the border between RA4 and RA2;

update its registration in area RA3 when passing the border between RA2–RA3;

update its registration in area RA2 when passing the border between RA3–RA2; and to update its registration in area RA1 when passing the border between RA2–RA1.

It is therefore conceivable that because of a hilly and mountainous terrain or because of heavy traffic in a city centre (several re-routes), the mobile station MS is forced to make at least four registration updates according to the known registration methodology, until it is located in the area RA1, as assumed in FIG. 1.

Figure 2C:
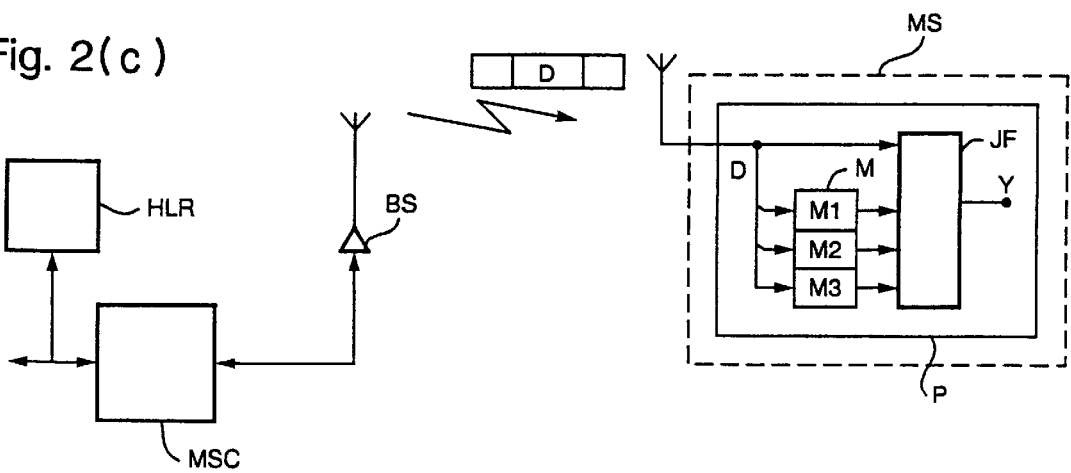

The inventive registration method will be described in more detail with reference to FIG. 2. A base station BS, which may be one of the base stations B31, B32, . . . according to FIG. 1 for instance, transmits a registration identity (X3) in the form of a message word for the registration area concerned (area RA3) over the control channel (FOCC). The base station BS communicates in a known manner with a mobile radio switching centre MSC which includes a home location register HLR which stores data relating to the location of the mobile stations in the system. The mobile radio switching centre MSC and the register HLR may be common to all base stations shown in FIGS. 1 and 4, for instance.

A mobile radio station MS has entered the area RA3 and is assumed to have registered itself in response to the registration identity X=X3 transmitted by the base station BS.

The mobile radio station MS is constructed in a known manner, for instance in accordance with the teachings of the aforesaid U.S. Pat. No. 5,081,679 (FIG. 2). The station MS includes a processor which controls the various transmission and reception functions of the mobile telephone set and includes memory space for the various messages that are exchanged between the mobile station and base station/ switching centre. These functions and associated switching units form part of the known technique and will not be described in detail here.

In the illustrated case, the mobile station MS is assumed to be a mobile telephone set which includes a processor P capable of executing the aforesaid control and memory functions. The processor P includes a memory space M which in the illustrated case has three memory positions M1, M2, M3 in which three identities of given registration areas are stored in accordance with the present method, as explained in more detail below. When receiving over the control channel FOCC, the memory space M can be accessed in a known manner, via the receiving units of the telephone set, for writing into the memory positions M1, M2 and M3 those identities that are contained in a message word which relates to the registration process and which is received from the base station.

It is assumed that in a previous registration process, the mobile telephone MS has been allocated the registration identities X1, X2 and X3 for three different registration areas which have been stored in the memory positions M1, M2 and M3 respectively, in accordance with FIG. 2a. According to FIG. 2a, the base station BS transmits a message in the form of a so-called "OMT" ("overhead message train") over FOCC with a registration identity X for the registration area of the base station, so that the mobile telephone will be able to evaluate the transmitted identity. The message is received by the mobile telephone MS and the transmitted identity X is delivered to a comparison unit JF. This unit compares the identity X with the identities X1, X2, X3 stored in the memory positions M1, M2, M3. The comparison unit JF produces a signal parameter Y (0 or 1) which informs the processor P of those measures or procedures that may possibly be taken in accordance with the following.

If the identity X is identical to one of the identities X1, X2 or X3, the mobile telephone MS will do nothing. On the other hand, if the identity X differs from all of the identities X1, X2 or X3, the mobile telephone MS will request registration over the reverse control channel RECC with information relating to the subscriber identity AbID, see FIG. 2b.

If the comparison made in the unit JF showed that none of the identities X1, X2 or X3 was equal to X and that the mobile telephone is thus still not registered in the registration area that belongs to the service area of the base station, this is reported to the base station in conjunction with the message sent over RECC, FIG. 2b. The base station BS informs the mobile switching centre MSC of the subscriber identity AbID, and the switching centre then effects registration in the location register HLR and sends to the mobile station as confirmation of registration in the location register HLR a new list D containing registration identities X4, X5, X6 which replace the earlier stored list X1, X2, X3, see FIG. 2c. At least one of these identities may be identical to one of the earlier stored identities, with the exception of the identity X that applies to the new registration area and which was not found among the earlier identities. The new list D, however, is not a global list sent to all mobile stations within the service area, but an individual list which defines a so-called location area and which is sent to this mobile station in conjunction with precisely this registration. The new list may be determined by the mobile telephone subscription and is adapted directly in accordance with movement of the mobile telephone.

Thus, in a corresponding situation in the same location, another mobile telephone could be sent another list which has at least one identity which is common to the list of the aforesaid mobile telephone, namely the registration identity X of the aforesaid base station.

The list D need not in accordance with the aforegoing be stored in the land system and sent to the mobile telephone. Alternatively, the new list D may be stored in the mobile telephone and the land system (base station) can send an address to the mobile telephone pointing-out the new list to be used, when confirming the registration in accordance with the aforegoing. This makes a further saving on registration traffic. For instance, the list D may be stored in the mobile telephone when signing the telephone subscription.

Figure 3:
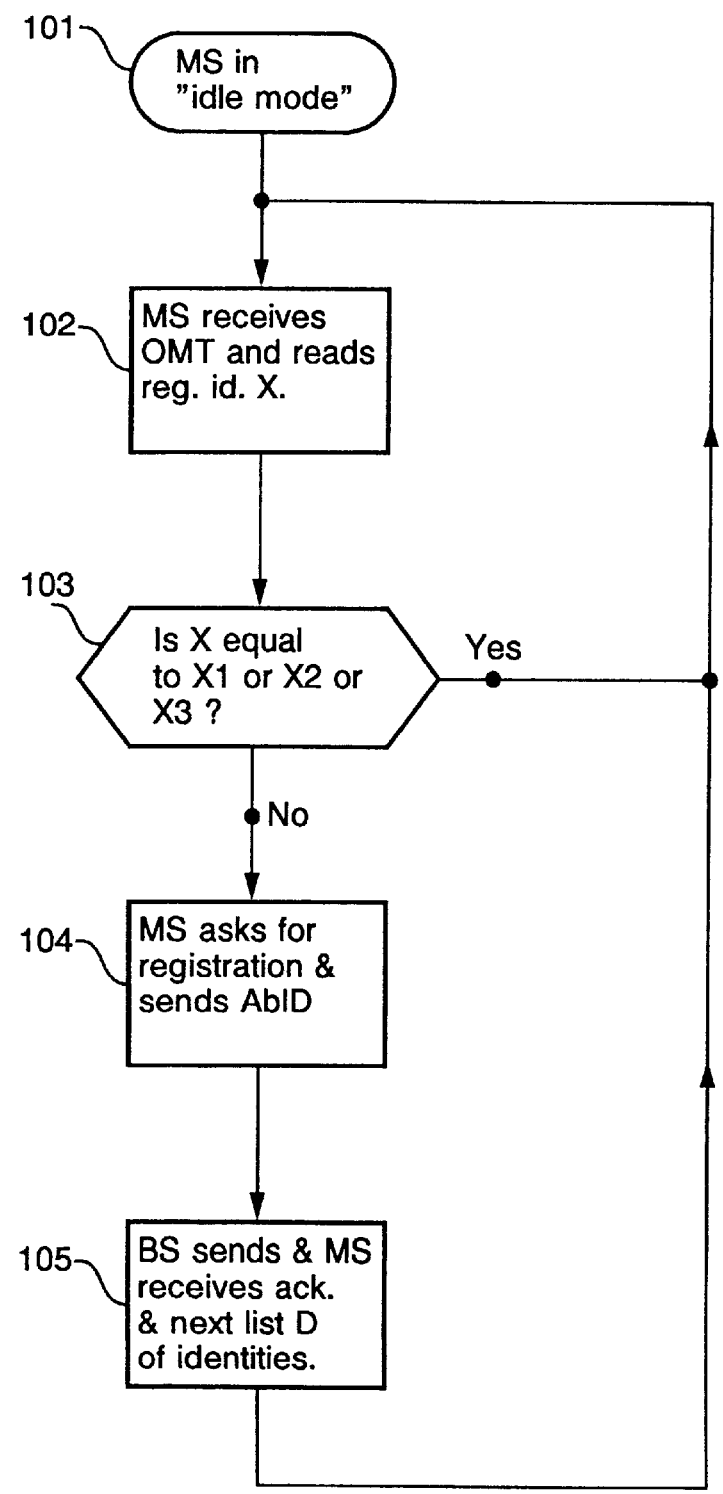
FIG. 3 is a flow chart which more closely illustrates the inventive method.

The flow chart shown in FIG. 3 illustrates the aforedescribed and the different steps stored in a program in the mobile telephone microprocessor (referenced 134, FIG. 2 in the aforesaid U.S. patent specification). In FIG. 3, the block 101 discloses that the mobile radio telephone MS is in its "idle mode", i.e. switched-on and ready to receive messages over the channel FOCC, in this case a global message OMT from a base station for possible registration.

At a given time point, block 102, a base station BS sends the message OMT, which reaches all mobile stations within the base station service area, including the mobile telephone MS in particular. The message OMT includes an identity X for this service area. Block 103 denotes that the mobile radio telephone MS makes a comparison between the received identity X and the identities X1, X2 and X3 stored in the memory space.

If the comparison showed that one of the identities X1, X2 or X3 was identical with identity X ("Yes"), a return is made to the beginning of the process and a loop is formed, provided that the condition "Yes" is fulfilled.

On the other hand, if none of the identities is identical to identity X ("No"), the mobile telephone MS asks to be registered, block 104. Registration is effected in the register HLR by the mobile telephone switching centre MSC (FIG. 2b) in a known manner, by the mobile telephone MS in FIG. 2b first sending its subscriber identity in accordance with the aforegoing. The mobile radio switching centre MSC then sends (block 105) the new list D to the mobile station MS via the base station BS over the forward control channel FOCC (FIG. 2c), together with a confirmation that registration has taken place. The procedure then returns to the starting state, before the block 102.

The list sent to the mobile telephone after registration may be configured in accordance with the wishes of the mobile telephone subscriber. For instance, the identities contained by the list may define a location area which corresponds to the home location, working place and a route often taken between these two locations, these identities being stored in the home location register HLR and sent to the mobile telephone by the switching centre MSC in conjunction with the registration procedure, when the mobile station has entered the aforesaid location area.

Figure 4:
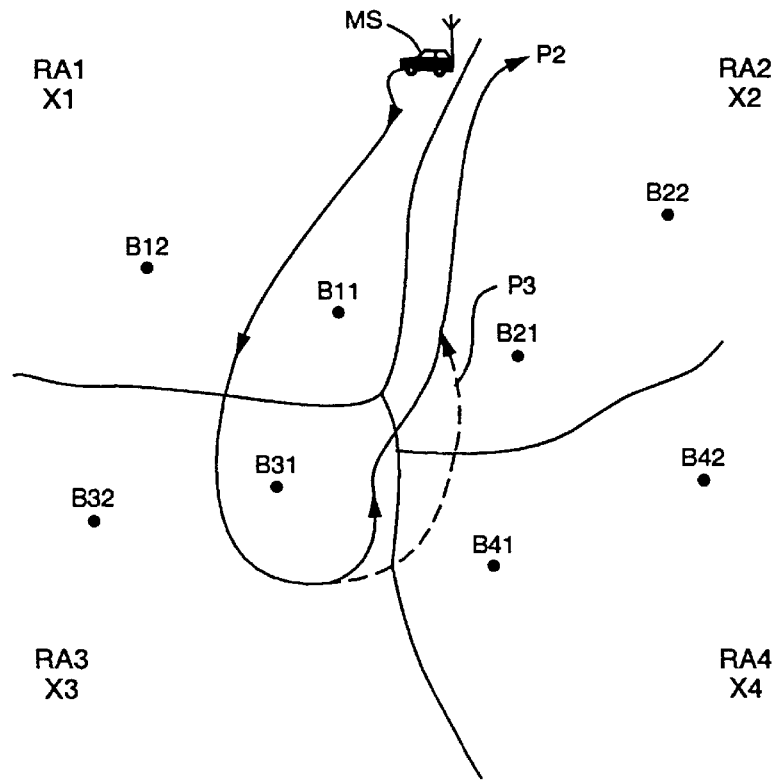
FIG. 4 is a diagram similar to the diagram of FIG. 1 but shows the allocation of registration identities in accordance with the proposed method.

In the region shown in FIG. 4 illustrates the allocation of registration identities for a given location area which covers non-overlapping registration areas.

Each of the base stations B11, B12; B21, B22; B31, B32; B41, B42 within the area is located in only one registration area and has therefore only one identity which it sends to the various mobile stations in conjunction with registration.

In the area shown in FIG. 4, it is assumed that a mobile station MS has roamed into the registration area RA1 having the identity X1 and is located in this area. It is assumed that the registration identities X1, X2 and X3, i.e. the identities of the areas RA1, RA2 and RA3, are stored in the memory space M of the mobile station (according to FIGS. 2a–c). The arrow P2 indicates the route travelled by the mobile station. It is assumed initially that the mobile station enters the service area of the base station B11 and is registered as being in this area without carrying-out an updating procedure, since no registration has earlier taken place and since the identity X1 is included in the list stored in the mobile station. The same applies for all remaining base stations within this registration area, in the absence of any registration whatsoever.

When the mobile station crosses the border between the areas RA1 and RA3 and therewith enters the service area of the base station B31, it is not necessary for the mobile station MS to register itself or for an earlier registration to be updated, since the identity X3 is also found on the list. Neither is it necessary to register the remaining base stations in the area RA3 (base station B32).

No registration or registration updating is effected when the mobile station leaves the area RA3 and enters the area RA2, as shown by the arrow P2, since the identity X3 is stored in the memory space M of the mobile station MS. In the case of the illustrated embodiment, registration and subsequent updating are only carried out should the mobile station MS choose to follow another route, as indicated by the broken line arrow P3, in which case registration is made in response to a global message from the base station B41, in accordance with the above. This base station transmits the identity X4, but since this identity is not found on the list stored in the mobile station, B41 sends to the mobile station MS in conjunction with the updating procedure a new list D which includes, for instance, the identities X2, X3 and X4, which are then stored in the memory space M of the mobile station (FIG. 2).

Figure 5:
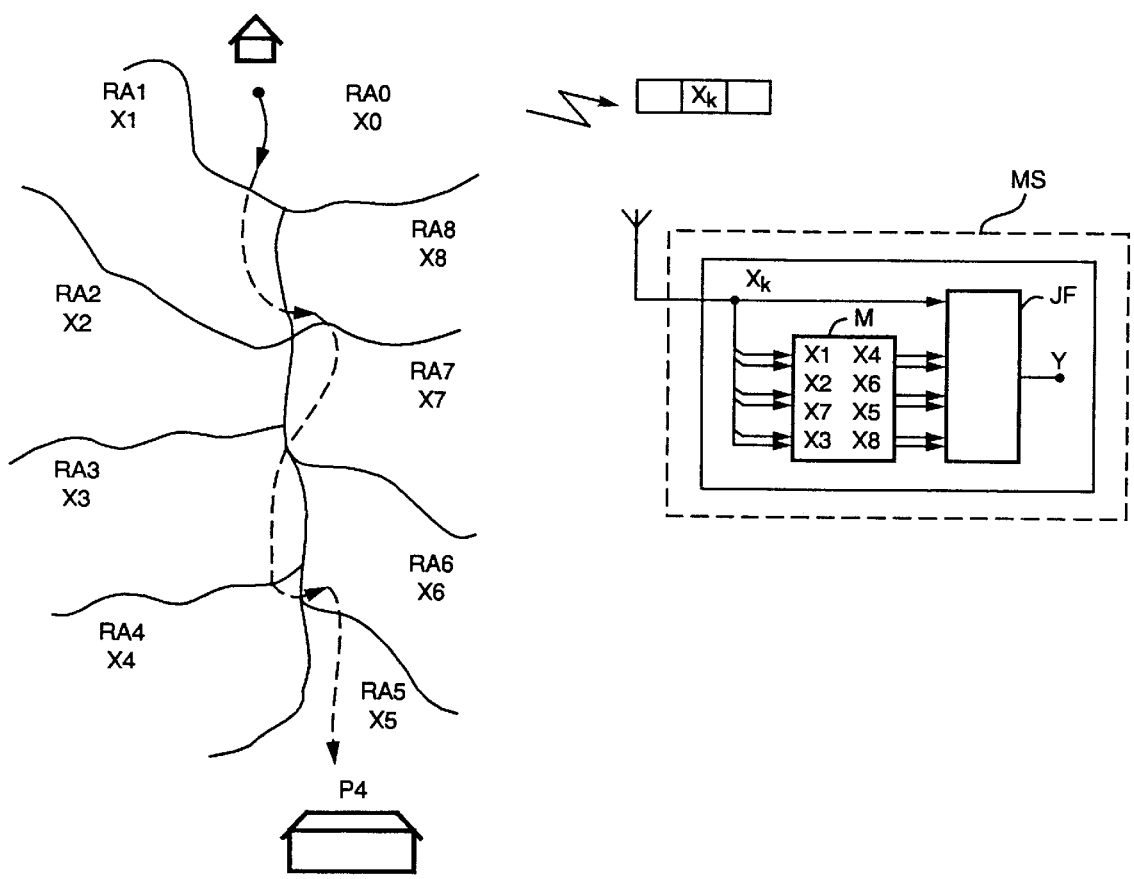
FIG. 5 is a diagram which illustrates a number of registration areas through which a mobile station roames while applying the inventive method.

With the intention of illustrating the principles of the invention and the advantages afforded thereby still further, reference is now made to FIG. 5 which illustrates an extreme case of movement of a mobile station between different registration areas.

The FIG. 5 illustration includes eight registration areas RA0, RA1, RA8, RA7, RA3, RA4, RA6 and RA5 within the area in which the mobile station moves in accordance with the arrow P4, for instance from home to work place, and through which roaming mobile station MS shall travel. Thus, in this case, the home location register of the mobile radio system may contain the seven different registration identities X1, X8, X7, X3, X4, X6 and X5, which shall be stored later in the mobile station processor according to FIGS. 2a–2c and which are used in the event of registration during the journey of the mobile station. The registration identity is referenced Xk and is sent from the base stations in respective areas during the journey of the mobile station. In this case, no registration is necessary and accordingly no registration is carried out during passage of the mobile station through the different registration areas.

The different identities are reported to the mobile station from the home location register HLR of the home system, via the base station, in accordance with FIG. 2a.

It is also possible for a mobile telephone subscriber who knows that he/she will often travel along this particular route to allow the telephone operator to insert those registration identities that will be used in accordance with the aforegoing at the time of procuring the telephone set.

The invention has been described above with reference to registration areas that include several cells, which is assumed to be a normal case in the future when many microcells are present. It is also conceivable, however, for each registration area to consist of a single cell and therewith increase so-called granularity in the proposed method. In this case, the identity of a registration area will coincide with the identity of a single cell.

According to another variant of the invention, the message OMT on the channel FOCC reports globally the registration identity (=cell identity) with the aid of X-Y coordinates and, in conjunction with registration, informs the mobile individually of the radius of the location area. In this case, a new registration is made when the cell to which the mobile listens is a cell that transmits a global cell identity X-Y which lies outside the circle defined by said radius and the latest registered X-Y coordinates (=cell identity).

This enables individual mobile-station location areas of different sizes to be defined by sending to an individual mobile in conjunction with registration a radius instead of list D, in accordance with FIG. 2. In this case, the memory unit and comparison circuit of the mobile are replaced with an algorithm which calculates whether or not the mobile has proceeded beyond the circle that constitutes the present location area.

The aforementioned X-Y coordinates need not unambiguously define the position on the earth as a whole. The last digits in the coordinates will suffice. For instance, the position can be calculated with a resolution of 100 m and with 100 km maximum in a Cartesian coordinate system, which corresponds to three decimal positions.

The present invention can also be combined with existing methods of defining location areas. For instance, a single mobile-individual home location area can be defined as including the home, work place and the route between home and work, while applying global location areas elsewhere, in accordance with existing standards. This may require the cells to transmit both the identity of the registration area and their own identity within said registration area.

It should be noted that registration can also be initiated by "time out" when using periodic registration, and by "power on" of the mobile, in addition to when the registration area on OMT no longer coincides with the stored values.

We claim:

1. A method of registration in a cellular mobile radio system, said cellular mobile radio system having a plurality of registration areas, each said registration area being divided into service areas and each said service area being associated with a primary radio station for servicing mobile stations located in said service area wherein each said registration area is assigned an identity and said identity is transmitted repeatedly from said primary radio stations associated with said service areas of said registration area and wherein said mobile stations listen for said transmitted identity, comprising the steps of:

determining an individual location area associated with at least a determined one of said mobile stations based upon a location of said determined one of said mobile stations and at least one other mobile station dependent criterion, said individual location area comprising at least two of said registration areas determined in accordance with said criterion and independently of system oriented location areas;

storing information relating to said individual location area in said determined one of said mobile stations prior to said determined one mobile station entering said location area and prior to registration of said determined one mobile station in any of said registration areas included in said location area;

registering said determined one mobile station in said registration area in which said determined one mobile station is located if said determined one mobile station determines that none of the registration areas in the location area according to said stored information is the same as the registration area in which said at determined one mobile station is located.

2. The method of claim 1, wherein said information relating to said individual location area is stored by said mobile radio system and transmitted to said determined one mobile station in conjunction with prior registration.

3. The method of claim 1, wherein said information relating to said individual location area is stored in said mobile radio system and transmitted to said determined one mobile station in the for of a list of identities of said registration areas in said individual location area at approximately that moment in time.

4. The method of claim 1 wherein said determined one other mobile station dependent criterion is anticipated movement of said determined one of said mobile stations.

5. The method of claim 1 wherein said determined one other mobile station dependent criterion is a mobile station subscription.

6. A method of registration in a cellular mobile radio system, said cellular mobile radio system comprising a plurality of registration areas, each said registration area being divided into service areas and each said service area being associated with a base station for servicing mobile stations located in said service area wherein each said registration area has an identity characteristic of said registration area and which is transmitted repeatedly from said associated base stations in said service areas in said registration area to each said mobile station in said service areas in said registration area before registration of at least one of said mobile stations in said registration area, and wherein the mobile stations receive said transmitted identity, comprising the steps of:

determining an individual location area associated with a determined one of said mobile stations based upon a location of said determined one of said mobile stations and at least one other mobile station dependent criterion, said individual location area comprising at least two said registration areas determined in accordance with said criterion and independently of system oriented location areas;

comparing in said determined one mobile station the received transmitted identity with a list of identities stored in said determined one mobile station, said list containing at least two identities, and said list having been stored before said at least one mobile station entered said individual location area and before registration in said registration area in which said determined one mobile station is located; and requesting registration of said determined one mobile station if said determined one mobile station determines that the received said transmitted identity does not coincide with any of said identities in said list.

7. The method of claim 6, further comprising the step of transmitting to said determined one mobile station in response to said request for registration an updated list to be stored in said determined one mobile station, said updated list containing at least two identities one of which being the identity of the registration area in which said determined one mobile station is located.

8. The method of claim 6 further comprising the step of requesting no additional identities if said determined one mobile station determines that the received said transmitted identity coincides with at least one of said identities in said list.

9. The method of claim 6 wherein said determined one other mobile station dependent criterion is anticipated movement of said determined one of said mobile stations.

10. The method of claim 6 wherein said determined one other mobile station dependent criterion is a mobile station subscription.

* * * * *